United States Patent
Miyata et al.

[11] Patent Number: 6,133,395
[45] Date of Patent: Oct. 17, 2000

[54] POLYURETHANE COMPOSITIONS

[75] Inventors: Akihiro Miyata; Kazunori Ishikawa; Kiminori Araki, all of Kanagawa, Japan

[73] Assignee: The Yokohama Rubber Co., Ltd., Tokyo, Japan

[21] Appl. No.: 09/189,622

[22] Filed: Nov. 10, 1998

[30] Foreign Application Priority Data

Nov. 12, 1997 [JP] Japan .................................. 9-310396
Aug. 21, 1998 [JP] Japan ................................. 10-235194
Nov. 6, 1998 [JP] Japan ................................. 10-316211

[51] Int. Cl.$^7$ .......................... C08G 18/38; C08G 18/10; C08G 18/40; C08G 18/72; C08G 18/73

[52] U.S. Cl. ................ 528/28; 252/182.14; 252/182.22; 525/453; 525/474; 528/32; 528/38; 528/59; 528/67; 528/905

[58] Field of Search .................. 528/28, 32, 38, 528/59, 67, 905; 525/453, 474; 252/182.22, 182.14

[56] References Cited

U.S. PATENT DOCUMENTS

| | | | |
|---|---|---|---|
| 3,627,722 | 12/1971 | Seiter ....................................... | 524/869 |
| 4,067,844 | 1/1978 | Barron et al. ........................... | 525/453 |
| 4,374,237 | 2/1983 | Berger et al. ........................... | 528/28 |
| 4,555,561 | 11/1985 | Sugimori et al. ....................... | 528/26 |
| 4,687,533 | 8/1987 | Rizk et al. ............................... | 156/307 |
| 4,908,395 | 3/1990 | Kurita et al. ............................ | 522/42 |
| 5,623,044 | 4/1997 | Chiao ...................................... | 528/28 |
| 5,852,137 | 12/1998 | Hsieh et al. ............................ | 525/458 |
| 5,866,651 | 2/1999 | Moren et al. .......................... | 524/588 |
| 5,932,652 | 8/1999 | Roesler et al. ......................... | 524/839 |
| 5,952,445 | 9/1999 | Roesler et al. ......................... | 528/28 |
| 6,005,047 | 12/1999 | Shaffer et al. ......................... | 524/590 |
| 6,046,270 | 4/2000 | Roesler et al. ......................... | 524/590 |
| 6,057,415 | 5/2000 | Roesler et al. ......................... | 528/28 |

FOREIGN PATENT DOCUMENTS 9-032239  2/1997  Japan .

*Primary Examiner*—Rabon Sergent
*Attorney, Agent, or Firm*—Finnegan, Henderson, Farabow, Garrett & Dunner, L.L.P.

[57] ABSTRACT

This invention is a one-component moisture curable polyurethane composition containing a urethane prepolymer and at least one silane compound containing an average of at least 1.5 NCO groups, and an average of at least 1.5 hydrolyzable alkoxy groups, selected from the group comprising a silane compounds (B-1) which is prepared by the addition reaction of a secondary aminoalkoxysilane compound and a polyol-based polyisocyanate compound, and a lysine-based silane compound (B-2). The Polyol-based polyisocyanate compound is a reaction product of a polyol more than triol and diisocyanate. The composition of the invention is particularly suitable for bonding glass to other substrates such as, for example, metal, plastics, and painted steel plates without employing a primer. Moreover, the composition has good foaming resistance, as well as good elongation.

9 Claims, No Drawings

POLYURETHANE COMPOSITIONS

BACKGROUND OF THE INVENTION

The present invention relates to one-component moisture curable polyurethane compositions. More particularly, the present invention pertains to one-component moisture curable polyurethane compositions, which exhibit good bonding strength without employing a primer when applied to substrates, such as, for example, glass, plastics, painted boards, painted steel plates, aluminum plates and mortar.

Various polyurethane compositions have been widely used as sealants and adhesives. Two types of polyurethane compositions have been known in the art. One is a two-pack type, which holds polyols and isocyanates separately. The other is a one-component type, which cures by such as, for example, moisture in the air. The one-component type has recently found more applications, since it is easy to handle and does not require the mixing of components at an application site.

One-pack moisture curable polyurethane compositions are described, for example, in U.S. Pat. No. 4,374,237 and U.S. Pat. No. 4,687,533. U.S. Pat. No. 4,374,237 describes a polyurethane sealant containing a prepolymer, which contains at least two silane groups per molecule. The prepolymer is prepared by reacting a urethane prepolymer with a secondary aminosilane. U.S. Pat. No. 4,687,533 describes a polyurethane sealant containing a prepolymer having a pendant alkoxysilane group.

However, such polyurethane sealants have a long curing time. This creates a safety problem when the sealants are used in bonding a windowpane to a vehicle body. Moreover, the sealants have unsatisfactory physical properties as a structural material.

U.S. Pat. No. 5,623,044 describes a polyurethane sealant, which contains a reaction product of secondary aminosilane and a polyisocyanate, such as a trimer of isophorone diisocyanate, a biuret adduct of hexamethylene diisocyanate and polyphenylpolymethylene isocyanate.

However, such polyurethane sealants having these reaction products are not sufficient in primary adhesive strength. Moreover, high content of diisocyanate biuret adduct may give a detrimental effect on physical properties of sealants. This causes a need to employ a primer including a silane coupling agent when a window pane is bonded to a vehicle body.

Japanese Unexamined Patent Publication No. 9-32239 discloses a production method of a siding with tiles where a polyurethane based adhesive of one-component moisture curing type is employed. The adhesive contains not only a urethane prepolymer prepared by reacting a polyol having polyfunctional (such as three functional) groups with polyisocyanate, but also other components, such as silane coupling agents of amino type and glycidyl type.

On the other hand, when a one-component moisture curable polyurethane composition is cured, free isocyanates in a urethane prepolymer react with moisture to generate carbon dioxide gas. The gas causes foams to be formed within a cured material. Particularly, foaming occurs more easily under high temperature and high humidity conditions. Therefore, it may cause a problem, if the composition is to be used for applications, such as sealing materials for constructions and sealants for vehicle bodies, where the composition may be exposed to high temperature and high humidity during a curing period. It will be desirable to provide a polyurethane sealant, which solves above problem and has an excellent bonding strength to substrates such as glass, metal, plastics, and painted steel plates without employing a primer.

SUMMARY OF THE INVENTION

Accordingly, it is an objective of the present invention to provide a one-component moisture curable polyurethane composition, which provides an excellent bonding strength to such as glass, metal, plastics, and painted steel plates without employing a primer, and, moreover, is excellent in curability, foaming resistance, and elongation.

To achieve the above objective, the present invention provides a one-component moisture curable polyurethane composition containing a urethane prepolymer (A), and a silane compound (B) containing an average of at least 1.5 NCO groups, and an average of at least 1.5 hydrolyzable alkoxy groups, contains at least one selected from the group comprising a silane compound (B-1) and another silane compound (B-2). The silane compound (B-1) is prepared by an addition reaction of a polyisocyanate compound containing 3 or more isocyanate groups per molecule, which are prepared by reacting a polyol more than triol having a molecular weight of not more than 500 with diisocyanates, and a secondary aminoalkoxysilane compound(s). The polyol is preferably trimethylolpropane.

The silane compound (B-2) is prepared by an addition reaction of a lysine isocyanate compound having 2 or 3 isocyanate groups and a secondary aminoalkoxysilane compound(s). The lysine isocyanate compound can be represented by the following formula:

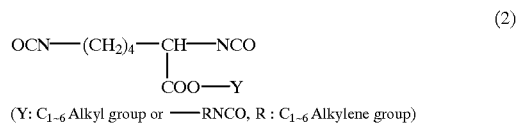

(Y: $C_{1-6}$ Alkyl group or —RNCO, R : $C_{1-6}$ Alkylene group)

The polyurethane composition contains the silane compound (B) in the range of from 0.07 to 10 percent, preferably from 0.07 to 5 percent, by weight against the total weight of the polyurethane composition. In those ranges, the polyurethane composition shows an excellent bonding strength. Particularly, the content of the silane compound (B) in the polyurethane composition is more preferably in the range of from 0.07 to less than 0.5 percent by weight. In this range, the polyurethane composition secures an excellent bonding strength without sacrificing elongation when it is cured.

The polyurethane composition can contain in addition to the urethane prepolymer and the silane compound having NCO groups and hydrolyzable alkoxy groups, at least one of alkenyl group-containing silane compounds, represented by the following formula(3):

wherein $R^aO$ represents a hydrolyzable alkoxy group;

$R^b$ represents an alkyl group with a carbon number of 1~3;

$R^c$ represents an alkenyl group-containing organic group, which may have a heteroatom(s); and n is an integer from 0 to 3.

The alkenyl group-containing silane compound can be contained in the range of from 0.05 to 10 parts by weight against 100 parts by weight of the urethane prepolymer.

The composition of the invention is particularly suitable as primerless polyurethane composition for glass to be bonded to other substrates such as, for example, metal, plastics, and painted steel plates without employing a primer. Moreover, the composition has good foaming resistance, as well as good elongation properties.

Other aspects and advantages of the present invention will become apparent from the following description.

DETAILED DESCRIPTION OF THE INVENTION

A one-component moisture curable polyurethane composition according to the present invention (hereinafter called the composition of the invention) will now be described in more detail.

The composition of the invention is a polyurethane composition, which includes a urethane prepolymer (A) as a main component, and at least one silane compound (B) selected from the group comprising a specific silane compound (B-1) and another specific silane compound (B-2), which are characterised later, and has an average of at least 1.5 isocyanate groups, and an average of at least 1.5 hydrolyzable alkoxy groups combined to silicon per molecule.

The urethane prepolymer (A) used in the composition of the present invention may be any prepolymers typically used in one-component polyurethane compositions and is a reaction product of a polyol and an excess amount of polyisocyanate (namely, an excess amount of NCO groups against OH groups.)

Polyols used in the preparation of the urethane prepolymer (A) may be any polyols typically used in one-component polyurethane compositions and include, for example, polyether polyols, polyester polyols, other polyols, and mixtures thereof.

Polyether polyols are preferably polyether polyols prepared by adding at least one of propylene oxide, ethylene oxide, butylene oxide, and stylene oxide to at least one of polyhydric alcohols, such as, for example, ethylene glycol, diethylene glycol, propylene glycol, dipropylene glycol, glycerin, 1,1,1-trimethylolpropane, 1,2,5-hexanetriol, 1,3-butanediol, 1,4-butanediol, 4,4'-dihydroxyphenylpropane, 4,4'-dihydroxyphenylmethane, and pentaerythritol; and polyoxytetramethyleneoxide. Samples of polyether polyols include polyoxypropylene glycol (PPG), polytetramethylene ether glycol (PTMG), polyethylene glycol (PEG) and polyoxypropylene triol, etc.

As samples of polyester polyols, preferably illustrative are condensation polymers which are prepared by reacting at least one of ethylene glycol, propylene glycol, butanediol, pentanediol, hexanediol, cyclohexanedimethanol, glycerin, 1,1,1-trimethylolpropane, and other polyols with low molecular weight, with at least one of glutamic acid, adipic acid, pimeric acid, suberic acid, sebacic acid, terephthalic acid, isophthalic acid, other carboxylic acids with low molecular weight, and oligomers. Polyester polyols further include polymers, which prepared by ring-opening polymerization of propiolactone, valerolactone and caprolactone etc.

Suitable other polyols include polymer polyols, polycarbonate polyols, polybutadiene polyols, hydrogenated polybutadiene polyols, acryl polyols, and polyols with low molecular weight, such as ethylene glycol, diethylene glycol, propylene glycol, dipropyleneglycol, butanediol, pentanediol, and hexanediol.

Particularly, polyols employed in the present invention are preferably polyether polyols having an average molecular weight between 1000 and 15000, preferably between 1000 and 10000. The polyether polyols in the above molecular weight range are desirable in glass transition temperature, and physical properties as a sealant after cured.

Polyisocyanates used in the preparation of the urethane prepolymer (A) may be any polyisocyanates typically used in one-component polyurethane compositions. Among them, suitable are aromatic polyisocyanates such as 2,4-tolylenediisocyanate, 2,6-tolylenediisocyanate, phenylenediisocyanate, diphenylmethane-4,4'-diisocyanate, naphthalene-1,5-diisocyanate, and triphenylmethanetriisocyanate and their hydrogenated compounds; aliphatic polyisocyanates such as , ethylenediisocyanate, propylenediisocyanate, tetramethylenediisocyanate, and hexamethylenediisocyanate; alicyclic polyisocyanates such as isophoronediisocyanate; allylaliphatic polyisocyanates such as xylylenediisocyanates, and their hydrogenated compounds; and mixture thereof.

The urethane prepolymer (A), which is employed in the present invention may be prepared by reacting a polyol described above and an excess amount of a polyisocyanate. The mixing ratio of polyisocyanate groups to polyol groups in the reaction mixture is preferably between 1.2 and 2.5, and more preferably between 1.5 and 2.4 (isocyanate groups/hydroxyl groups). The urethane prepolymer (A) in the above mixing ratio will have proper viscosity.

Preparation of the urethane prepolymer (A) may be carried out in accordance with the typical preparation method of urethane prepolymers. As a matter of fact, a mixture of a polyol and a polyisocyanate in the range of above mixing ratio is mixed at a temperature between 50° C. and 100° C. Urethane catalysts, such as organic stannous and/or stannic compounds, organic bismuth compounds, and amines, may be added as desired.

The urethane prepolymer (A) prepared in such manner has an average of isocyanate content preferably at least 2.0, and more preferably 2.2 per molecule. The content of isocyanate group in the prepolymer is preferably at least 0.4 wt %, and more preferably at least 0.5wt %. An average molecular weight of the urethane prepolymer (A) is preferably between 2000 and 20000, and more preferably between 2000 and 15000. When the urethane prepolymer (A) falls in the above ranges, the composition of the present invention has desirable physical properties, such as viscosity and bonding strength. When the urethane prepolymer (A) is cured, it has desirable physical properties as a sealant such as hardness and modulus.

The compound (B) as a component in the composition of the present invention is a silane compound which contains an addition reactant (adduct) of a secondary aminoalkoxysilane compound and a specific polyisocyanate, and has an average of at least 1.5 isocyanate groups, and an average of at least 1.5 hydrolyzable alkoxy groups combined to silicon per molecule. Namely, the silane compound (B) contains at least one selected from the group comprising a silane compound (B-1) prepared by reaction of a specific polyisocyanate and a secondary aminoalkoxysilane (s), and a silane compound (B-2) prepared by addition reaction of a lysine isocyanate and a secondary aminoalkoxysilane.

The secondary aminoalkoxysilane is a compound having a secondary amino group and a hydrolyzable alkoxy group combined with silicon (hereinafter called secondary aminosilane). The secondary aminosilanes include, for example, 3-phenylaminopropyltrimethoxysilane, N,N-bis (3-trimethoxysilylpropyl)amine, and the like.

The silane compound (B-1) is a reaction product prepared by reacting a polyisocyanate compound having at least three isocyanate groups per molecule, which is a reactant of a polyol more than triol having a molecular weight of not more than 500 with a secondary aminoalkoxysilane, at a mixing ratio to obtain the resulting adduct has an average of at least 1.5 isocyanate groups, and an average of at least 1.5 hydrolyzable alkoxy groups combined to silicon per molecule.

Both a biuret compound and a isocyanurate compound are well known as Polyisocyanate compounds having at least three NCO groups per molecule, in the art. However, polyisocyanates, which are employed in the preparation of the compound (B-1) are preferably prepared by reacting hydroxyl groups of a polyol more than triol having a molecular weight of not more than 500 with at least three moles of diisocyanates, because such polyisocyanates may provide good bonding strength even in a comparatively small amount.

The polyol includes trimethylolpropane (TMP), 1, 2, 5-hexanetriol, glycerin, pentaerythritol. Among them, trimethylolpropane (TMP) is particularly preferable. Diisocyanates include xylenediisocyanate (XDI), 1,3- and/or 1,4-di(isocyanatomethyl)cyclohexane (hydrogenated XDI), hexamethylenediisocyanate (HDI), and the like. Among them, hexamethylenediisocyanate (HDI) is particularly preferable, because it provides good bonding strength. Three moles of diisocyanates, which react with one mole of triol may be the same or different from each other.

Reactions between a polyol and diisocyanates may be carried out by using commercially available alcohols and isocyanates. In the present invention, samples of adduct products (polyisocyanate compounds) includes commercially available products such as CORONATE HL from Nihon Polyurethane Co., D-120N, and D-110N from Takeda Chemical Inds. Polyisocyanate compounds can contain solvents.

The compound (B-1) is prepared by reacting a secondary aminosilane and a polyisocyanate at a mixing ratio of at least 2.0~6.0, preferably 2.4~4.0, equivalent weight (NCO equivalent weight) of polyisocyanate against one equivalent weight (NH equivalent weight) of secondary aminosilane. The composition in the present invention in the above range of mixing ratio is desirable from the point of view of foaming resistance.

In the above reaction, a reaction solution having an adduct of a polyisocyanate compound and a secondary aminoalkoxysilane as a main ingredient is obtained. In the present invention, the reaction solution having reaction products and a solvent may be used as silane compound (B-1). The adduct is preferably each silane compound or mixtures thereof represented by the formula (1).

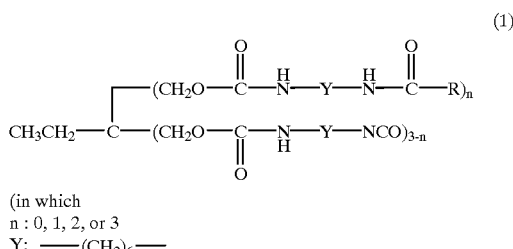

(in which
n : 0, 1, 2, or 3
Y: —(CH$_2$)$_6$—

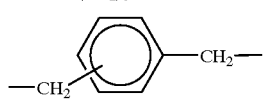

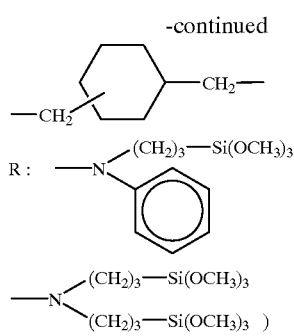

The silane compound having a lysine structure (B-2) is prepared by addition reaction of a lysineisocyanate having 2 or 3 isocyanate groups and a secondary aminoalkoxysilane (s). The lysine isocyanates can be represented by the following formula:

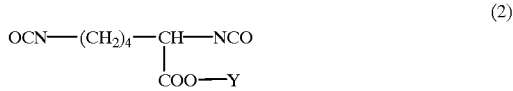

(Y : C$_{1-6}$Alkyl group or —RNCO, R : C$_{1-6}$Alkylene group)

More concretely, for example,

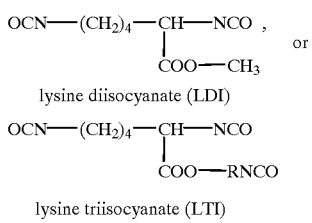

are shown.

The lysine isocyanate is employed as a single compound or a mixture thereof.

The compound (B-2) is prepared by reacting a secondary aminosilane, and lysine triisocyanate or lysine diisocyanate at a mixing ratio of at least 2.0~6.0 equivalent weight (NCO equivalent weight) of the diisocyanate or the triisocyanate against one equivalent weight (NH equivalent weight) of secondary aminosilane.

The composition in the present invention in the above range of mixing ratio is desirable from the point of view of foaming resistance. The composition may also be added with proper organic solvents such as toluene or the like before the above reaction takes place if viscosity control is needed.

The silane compound (B) described above has an average of at least 1.5, preferably 1.5~2.5 isocyanate groups, and an average of at least 1.5, preferably 1.5~9.0 hydrolyzable alkoxy groups combined with silicon. If the compound has the above range of isocyanate groups, the resultant composition of the present invention may preferably have good physical properties, such as, of viscosity, bonding strength, curing ability, and foaming resistance. If the compound has the above range of alkoxy groups, the resultant composition of the present invention may preferably have good physical properties, such as, of bonding strength, and curing ability.

The content of the compound (B) in the composition of the present invention is in the range of 0.07~10 percent by weight, and preferably 0.07~5 percent by weight against the total weight of the above urethane composition. The composition of the present invention having the above range of the compound (B) is desirable from the point of view of viscosity, foaming resistance at the time of curing, and cure-ability. Particularly, if the content of the compound (B) in the composition is in the range of from 0.07wt % to less than 0.5wt %, it will be more preferable since the composition ensures to have good bonding strength without sacrificing elongation properties when cured.

The one-component moisture curable polyurethane composition according to the present invention, which has urethane prepolymer (A), and silane compound (B) may additionally include a silane compound (C) represented by the following formula:

$(R^a O)_n R^b_{3-n} Si—R^c$ (3)

in which n is an integer from 1 to 3;

$R^a O$ represents a hydrolyzable alkoxy group;

$R^b$ represents an alkyl group with carbon number of 1 to 3; and $R^c$ represents an organic group containing an alkenyl group, which may include a heteroatom(s).

$R_a O$ is an alkoxy group with carbon number of 1 to 3, preferably a methoxy group or an ethoxy group. $R^b$ is preferably a methyl group or an ethyl group.

The heteroatom, which may be included in an $R^c$ group is such as oxygen, nitrogen, or sulfur. Samples of $R^c$ group, which may contain the heteroatom include the following groups:

—CH=CH$_2$ (Vinyl group);

—(CH$_2$)$_4$—CH=CH$_2$;

—(CH$_2$)$_8$—CH=CH$_2$;

—Ph—CH=CH$_2$ (Ph representing phenyl group);

—(CH$_2$)$_3$—O—CH=CH$_2$;

—(CH$_2$)$_{10}$—COO—CH=CH$_2$;

—(CH$_2$)$_3$—OCO—CH=CH$_2$;

—(CH$_2$)$_3$—OCO—C(CH$_3$)=CH$_2$ (methacryloxypropyl group); and

—(CH$_2$)$_3$—O—(CH$_2$)$_2$—OCO—C(CH$_3$)=CH$_2$.

Particularly, an $R^c$ is preferably a vinyl group or a methacryloxypropyl group among them.

Samples of alkenyl group-containing silane compounds (C) represented by the formula (3) includes, for example, vinyltrimethoxysilane, and 3-methacryloxypropyltrimethoxysilane. These two compounds are particularly preferred.

The polyurethane composition according to the present invention may include an alkenyl group-containing silane compound (C) in an amount of from 0.05 to 10 parts by weight, and preferably from 0.05 to 7 parts by weight against 100 parts by weight of the solid content of the polyurethane composition.

If an alkenyl group-containing silane compound (C) is added to a mixture of the urethane prepolymer (A), and the silane compound (B), which has both NCO group and alkoxy group, modulus of the one-component moisture curable polyurethane composition maybe easily controlled. This ensures elongation at break (Eb), and thus enhances elasticity (flexibility) of the cured material. Moreover, the addition of component (C) does not give a detrimental effect to original good bonding strength of the polyurethane composition.

In addition to the above components, the composition of the present invention may also includes additives, such as fillers, plasticizers, solvents, and curing accelerators, as long as the objective of the present invention is not impaired.

Examples of fillers include such as carbon black, clay, talc, calcium carbonate, white carbon (silica), silicic acid anhydride and mixtures thereof. Examples of suitable plasticizers include such as dibutylphthalate, dioctylphthalate, tetrahydrophthalic acid, azelaic acid, maleic acid, and mixtures thereof. Examples of suitable solvents include such as toluene, xylene, hexane, heptane, and mixtures thereof. Examples of suitable curing accelerators include such as dioctyltindilaurate, dibutyltindilaurate, tin octoate, lead octoate, tertiary amines, and mixtures thereof. The composition of the present invention may further be added with other compounds such as epoxysilanes, or isocyanate silanes, which contain one isocyanate group per molecule.

The composition of the present invention may be prepared by any suitable method employed in the preparation of a typical one-component moisture curable polyurethane composition. The preparation of the composition is preferably carried out under low moisture conditions, more preferably anhydrous conditions. Otherwise, moisture contained in production facilities will increase the viscosity of the composition and bring about hydrolysis of the compound (B). This leads to the lowering of bonding strength of the composition. The composition may be prepared, for example, by kneading a mixture of the urethane prepolymer (A), the compound (B), and, if needed, alkenyl group-containing silane compound (C,), and other additives under anhydrous conditions until the mixture becomes a uniform dispersion.

As described above, the compound (B) is prepared by reacting a polyisocyanate compound having at least three isocyanate groups with a secondary aminosilane, and has an average of at least 1.5 isocyanate groups and an average of at least 1.5 hydrolyzable alkoxy groups combined with silicon in a molecule. Since urethane prepolymer (A) includes the compound (B), the composition of the present invention has good physical properties such as, for example, good cure-ability without lowering storage stability, good bonding strength to substrates such as glasses, hard bonding painted boards etc. without applying a primer on, and good foaming resistance. By defining the amount of the compound (B) in the composition, good bonding strength, and good foaming resistance described above may be more securely insured. Therefore, the composition prepared in such manner may advantageously be used as a sealant for various substrates such as glass, plastics, hard bonding painted boards, painted steel plate, aluminum plates, and mortar.

ILLUSTRATIVE EMBODIMENTS

The present invention will now be described in more detail by reference to following examples. The following examples, however, are provided for the purpose of further illustrating the present invention only and should not be appreciated as limiting it in any way. Unless otherwise indicated, all parts and percentages are given by weight.

Preparation of Urethane Prepolymer

A urethane prepolymer was prepared first by mixing 500 g of polyoxypropylene diol (having an average molecular weight of 2000), 750 g of polyoxypropylenetriol (having an average molecular weight of 5000), and 214 g of 4,4'-diisocyanatephenylmethane (having molecular weight of 250). ad The mixture(NCO/OH of 1.8) was then added with 1460 g of dioctylphthalate. The mixture was thoroughly mixed under a nitrogen gas stream at 80° C. to obtain a urethane prepolymer having an isocyanate content of 1.1 percent.

Preparation of Silane Compounds

Adduct 1
336 g of an addition product (Nihon Polyurethane's CORONATE, NCO content of 12.8 percent) of three moles of HDI and one mole of trimethylolpropane, and 168 g of toluene were put into a flask with 4 inlet openings. While the mixture was mixed under a nitrogen gas stream, 87 g of 3-phenylaminopropyltrimethoxysilane was added dropwise to the mixture. The resultant adduct 1 had an isocyanate content of 4.9 percent (an adduct content of 57.4 percent.)

Adduct 2
150 g of an addition product (Takeda Chemical's D-120N, NCO content of 11.0 percent) of three moles of hydrogenated XDI and one mole of trimethylolpropane, and 106 g of toluene were put into a flask with 4 inlet openings. While the mixture was mixed under a nitrogen gas stream, 33 g of 3-phenylaminopropyltrimethoxysilane was added dropwise to the mixture. The resultant adduct 2 had an isocyanate content of 3.8 percent (an adduct content of 50.3 percent.)

Adduct 3
150 g of an addition product (Takeda Chemical's D-110N, NCO content of 11.7 percent) of three moles of xylylenediisocyanate and one mole of trimethylolpropane, and 81 g of toluene were put into a flask with 4 inlet openings. While the mixture was mixed under a nitrogen gas stream, 18 g of 3-phenylaminopropyltrimethoxysilane (Y-9669) was added dropwise to the mixture. The resultant adduct 3 had an isocyanate content of 5.9 percent (an adduct content of 52.4 percent.)

Adduct 4
168 g of an addition product (Nihon Polyurethane's CORONATE HL) of three moles of HDI and one mole of trimethylpropane, and 142 g of toluene were put into a flask with 4 inlet openings. While the mixture was mixed under a nitrogen gas stream, 58.2 g of N,N-bis[(3-trimethoxsilyl)propyl]amine (Nihon Unicar's A-1170) was added dropwise to the mixture. The resultant adduct 4 had an isocyanate content of 3.9 percent (an adduct content of 50.0 percent.)

Adduct 5
150 g of an addition product (Takeda Chemical's D-120N) of 3 moles of hydrogenated XDI and one mole of trimethylolpropane, and 117 g of toluene were put into a flask with 4 inlet openings. While the mixture was mixed under a nitrogen gas stream, 43.8 g of N,N-bis[(3-trimethoxysilyl)propyl]amine (Nihon Unicar's A-1170) was added dropwise to the mixture. The resultant adduct 5 had an isocyanate content of 3.5 percent (an adduct content of 50.3 percent.)

Adduct 6
150 g of an addition product trimethylolpropane (Takeda Chemical's D-110N) of 3 moles of xylylenediisocyanate and 93 g of toluene were put into a flask with 4 inlet openings. While the mixture was mixed under a nitrogen gas stream, 47.5 g of N,N-bis[(3-trimethoxysilyl)propyl]amine (Nihon Unicar's A-1170) was added dropwise to the mixture. The resultant adduct 6 had an isocyanate content of 4.0 percent (an adduct content of 55.1 percent.)

Adduct 7
336 g of an addition product (Nihon Polyurethane's CORONATE HL) of three moles of HDI and one mole of trimethylolpropane, and 168 g of toluene were put into a flask with 4 inlet openings. While the mixture was mixed under a nitrogen gas stream, 174 g of 3-phenylaminopropyltrimethoxysilane (Takeda Chemical's Y-9669) was added dropwise to the mixture. The resultant adduct 7 had an isocyanate content of 2.1 percent (an adduct content of 62.8 percent.)

Adduct 8
100 g of lysine triisocyanate (Kyowa Hakko Kogyo, NCO content of 47.1 percent) was put into a flask with 4 inlet openings. While stirring the content under a $N_2$ gas stream, 95.32 g of 3-phenylaminopropyltrimethoxysilane was added dropwise to the content. The resultant adduct 8 had an isocyanate content of 16.1 percent.

Adduct 9
100 g of lysine triisocyanate (Kyowa Hakko Kogyo, NCO content 47.1 percent) was put into a flask with 4 inlet openings. While stirring the content under a $N_2$ gas stream, 127.47 g of N,N-bis[(3-trimethoxysilyl)propyl]amine(A-1170) was added dropwise to the content. The resultant adduct 9 had an isocyanate content of 13.8 percent.

Adduct 10
100 g of lysine diisocyanate (Kyowa Hakko Kogyo, NCO content of 39.6 percent) was put into a flask with 4 inlet openings. While stirring the content under a $N_2$ gas stream, 120.21 g of 3-phenylaminopropyltrimethoxysilane (Y-9669) was added dropwise to the content. The resultant adduct had an isocyanate content of 8.9 percent.

Adduct 11: biuret adduct
126.8 g of HDI biuret adduct (Sumitomo Bayer Urethane's Sumidur N-75(same as 75% of Mobey's Desmodur N-100/ethyl acetate solution), NCO content of 17.49 percent), and 45 g of toluene were put into a flask with 4 inlet openings. While the mixture was mixed under a nitrogen gas stream, 90 g of N,N-bis[(3-trimethoxysilyl)propyl]amine (Nihon Unicar's A-1170) was added dropwise to the mixture. The resultant adduct 11 had an isocyanate content of 5.6 percent (an adduct content of 70.7 percent.)

Adduct 12: isocyanurate adduct
95.6 g of HDI isocyanurate adduct (Sumitomo Bayer Urethane's Sumidur N-3500 (NCO content of 23.23 percent, same as Mobey's Desmodur N-3300), and 45 g of toluene were put into a flask with 4 inlet openings. While the mixture was mixed under a nitrogen gas stream, 90 g of N,N-bis[(3-trimethoxysilyl)propyl]amine (Nihon Unicar's A-1170) was added dropwise to the mixture. The resultant adduct 12 had an isocyanate content of 6.4 percent (an adduct content of 80.5 percent.)

NCO/NH ratios, NCO content percentages, average NCO groups per molecule, average alkoxysilane groups per molecule on Adducts 1~12 are shown on table 1.

TABLE 1

| Adducts | 1 | 2 | 3 | 4 | 5 | 6 | 7 | 8 | 9 | 10 | 11 Biuret adduct | 12 Isocyanurate adduct |
|---|---|---|---|---|---|---|---|---|---|---|---|---|
| Addition reaction raw materials | | | | | | | | | | | | |
| Polyol component | TMP | TMP | TMP | TMP | TMP | TMP | TMP | | | | — | — |
| Isocyanate component | HDI | HXDI | XDI | HDI | HXDI | XDI | HDI | | | | biuret -HDI | isocyanurate -HDI |
| Lysine component | | | | | | | | LTI | LTI | LDI | | |
| Secondary aminoalkoxysilane | | Y-9669 | | | A-1170 | | Y-9669 | Y-9669 | A-1170 | Y-9669 | | A-1170 |

TABLE 1-continued

| Adducts | 1 | 2 | 3 | 4 | 5 | 6 | 7 | 8 | 9 | 10 | 11 Biuret adduct | 12 Isocyanurate adduct |
|---|---|---|---|---|---|---|---|---|---|---|---|---|
| NCO/NH | 3/1 | 3/1 | 3/0.5 | 3/1 | 3/1 | 3/1 | 3/2 | 3/1 | 3/1 | 2/0.5 | 3/1 | 3/1 |
| NCO % | 4.9 | 3.8 | 5.9 | 3.9 | 3.5 | 4.0 | 2.1 | 16.1 | 13.8 | 18.5 | 5.6 | 6.4 |
| Average number per adduct molecule | | | | | | | | | | | | |
| NCO group | 2.00 | 2.00 | 2.50 | 2.00 | 2.00 | 2.00 | 1.00 | 2.00 | 2.00 | 1.50 | 2.00 | 2.00 |
| Alkoxysilane group | 3.00 | 3.00 | 1.50 | 6.00 | 6.00 | 6.00 | 6.00 | 3.00 | 6.00 | 1.50 | 6.00 | 6.00 |

$$\text{NCO\%} = \frac{(\text{amount of NCO xg in a polyol or lysine/isocyanate reactant}) \times (1 - \text{NH/NCO})}{(\text{amount of polyol or lysine/isocyanate reactant}) + (\text{amount of solvent}) + (\text{amount of aminoalkoxysilane})} \times 100$$

TMP: trimethylolpropane
HDI: hexamethylenediisocyanate
HXDI: di(isocyanatemethyl)cyclohexane
XDI: xylylenediisocyanate
LTI: lysine triisocyanate
LDI: lysine diisocyanate
Y-9669: 3-phenylaminopropyltrimethoxysilane
A-1170: N,N-bis[(3-trimethoxysilyl)propyl]amine

EXAMPLES 1~18

100 g of a urethane prepolymer prepared in a manner described above, 102 g of fully dried carbon black, 0.2 g of dioctyltindilaurate, and one of adducts 1~6 and 8~10 prepared in a manner described above were mixed in accordance with compositions shown on table2. Each composition was mixed under anhydrous conditions to form corresponding polyurethane composition.

Curing time, bonding strength, foaming resistance, strength, and elongation of each resultant polyurethane composition were tested and evaluated by methods described below.

(1) Curing time

Tack-free time of the resultant polyurethane compositions were tested at 20° C. and 65 percent relative humidity (R.H.) Results were shown on table 2.

(2) Bonding strength test

Substrates; plate glass, and painted steel plates were applied with each polyurethane composition with a thickness of 3 mm to form test pieces. These test pieces were exposed to 20° C. and 65 percent R.H. for 3 day. Some of them were immersed in hot water at 40° C. or in a 50% windshield washer solution for 10 days additionally. Then, all test pieces were put on a peel test by a manual knife-cut method. Results were shown on table 2. Cohesive failure (cf) of a composition layer is shown in ratio (cf %) of cf area against total applied area. 100 cf % indicates that only cohesion failure of the composition was found in total applied area. Namely, there was no adhesion failure (peeling-off) on interfaces between a substrate; a plate glass or a painted steel plate, and a cured composition.

(3) Foaming resistance test

Substrates; plate glass, and painted steel plates were applied with each polyurethane composition with a thickness of 3 mm to form test pieces. After the test pieces were exposed to 20° C. and 65 percent R.H. for 3 hours, the test pieces were immersed in hot water at 40° C. for 3 days. These test pieces were checked whether a foam was found or not within a composition, or between a composition and a substrate. Results were shown on table 2. 'O' indicates that there was no foam within the composition, or between the composition and the substrate. 'X' indicates that there was a foam within the composition, or between the composition and the substrate.

(4) Strength and Elongation

Each polyurethane composition was cured at 20° C. and 65 percent R.H. for 7 days to cure the composition. Strength and elongation of the cured composition were tested in accordance with JIS 6251.

COMPARATIVE EXAMPLES 1~5

100 g of a urethane prepolymer prepared in a manner described above, 102 g of fully dried carbon black, 0.2 g of dictyltindilaurate, and 3-phenylaminopropyltrimethoxysilane (Nihon Unicar's Y-9669) or one of adducts 7, 11 and 12 prepared in a manner described above were mixed in accordance with compositions shown on table 2. Each composition was mixed under anhydrous conditions to form corresponding polyurethane composition.

TABLE 2(1)

| | Examples | | | | | | | |
|---|---|---|---|---|---|---|---|---|
| | 1 | 2 | 3 | 4 | 5 | 6 | 7 | 8 |
| Urethane prepolymers | 100 | 100 | 100 | 100 | 100 | 100 | 100 | 100 |
| Carbon black | 102 | 102 | 102 | 102 | 102 | 102 | 102 | 102 |
| Dioctyltindilaurate | 0.2 | 0.2 | 0.2 | 0.2 | 0.2 | 0.2 | 0.2 | 0.2 |
| Adduct 1 (adduct content 57.4%) | 6.6 | 3.3 | 1.65 | 0.66 | | | | |
| Adduct 2 (adduct content 50.3%) | | | | | 8.7 | 0.9 | | |
| Adduct 3 (adduct content 52.4%) | | | | | | | 8.7 | 1.8 |
| Content of an adduct In a polyurethane composition (wt %) | 1.82 | 0.92 | 0.47 | 0.19 | 2.08 | 0.22 | 2.16 | 0.46 |

TABLE 2(1)-continued

|  | Examples | | | | | | | |
|---|---|---|---|---|---|---|---|---|
|  | 1 | 2 | 3 | 4 | 5 | 6 | 7 | 8 |
| Curing time (min.) | 32 | 30 | 33 | 30 | 32 | 34 | 32 | 33 |
| Bonding strength to glass plate | | | | | | | | |
| at 20° C. and 65% R.H. for 3 days | 100% cf | 100% cf | 100% cf | 100% cf | 100% cf | 100% cf | 100% cf | 100% cf |
| in hot water at 40° C. for 10 days | 100% cf | 100% cf | 100% cf | 100% cf | 100% cf | 100% cf | 100% cf | 100% cf |
| in a 50% windshield washer solution for 10 days | 100% cf | 100% cf | 100% cf | 100% cf | 100% cf | 100% cf | 100% cf | 100% cf |
| Bonding strength to painted steel plate | | | | | | | | |
| at 20° C. and 65% R.H. for 3 days | 100% cf | 100% cf | 100% cf | 100% cf | 100% cf | 100% cf | 100% cf | 100% cf |
| in hot water at 40° C. for 10 days | 100% cf | 100% cf | 100% cf | 100% cf | 100% cf | 100% cf | 100% cf | 100% cf |
| in a 50% windshield washer solution for 10 days | 100% cf | 100% cf | 100% cf | 100% cf | 100% cf | 100% cf | 100% cf | 100% cf |
| Foaming resistance | ○ | ○ | ○ | ○ | ○ | ○ | ○ | ○ |
| Physical properties of cured material | | | | | | | | |
| strength (Tb) (MPa) | 6.0 | 6.1 | 6.8 | 7.0 | 5.9 | 6.6 | 6.0 | 6.8 |
| elongation (Eb) (%) | 220 | 270 | 350 | 400 | 190 | 390 | 200 | 340 |

All ingredients in the table are shown in parts by weight.
Content of adducts 1~3 including solvents are shown in parts by weight.
The content (%) of an adduct in a polyurethane composition = (Content of an adduct in an adduct solution/total weight of a polyurethane composition) × 100

TABLE 2(2)

|  | Examples | | | | | | Comparative Examples | |
|---|---|---|---|---|---|---|---|---|
|  | 9 | 10 | 11 | 12 | 13 | 14 | 1 | 2 |
| Urethane prepolymers | 100 | 100 | 100 | 100 | 100 | 100 | 100 | 100 |
| Carbon black | 102 | 102 | 102 | 102 | 102 | 102 | 102 | 102 |
| Dioctyltindilaurate | 0.2 | 0.2 | 0.2 | 0.2 | 0.2 | 0.2 | 0.2 | 0.2 |
| Adduct 4 (adduct content 50.0.%) | 5.8 | 1.5 | | | | | | |
| Adduct 5 (adduct content 50.3%) | | | 5.8 | 1.5 | | | | |
| Adduct 6 (adduct content 55.1%) | | | | | 6.2 | 1.2 | | |
| Adduct 7 (adduct content 62.8%) | | | | | | | | 3.9 |
| 3-phenylaminopropyltrimethoxysilane (Y-9669) | | | | | | | 1.4 | |
| Content* of an adduct in a polyurethane composition (wt %) | 1.39 | 0.37 | 1.40 | 0.37 | 1.64 | 0.32 | 0.69 | 1.19 |
| Curing time (min.) | 33 | 32 | 33 | 32 | 34 | 33 | 65 | 30 |
| Bonding strength to glass plate | | | | | | | | |
| at 20° C. and 65% R.H. for 3 days | 100% cf | 100% cf | 100% cf | 100% cf | 100% cf | 100% cf | 100% cf | 100% cf |
| in hot water at 40° C. for 10 days | 100% cf | 100% cf | 100% cf | 100% cf | 100% cf | 100% cf | 100% cf | 100% cf |
| in a 50% windshield washer solution for 10 days | 100% cf | 100% cf | 100% cf | 100% cf | 100% cf | 100% cf | 100% cf | 100% cf |
| Bonding strength to painted steel plate | | | | | | | | |
| at 20° C. and 65% R.H. for 3 days | 100% cf | 100% cf | 100% cf | 100% cf | 100% cf | 100% cf | 95% cf | 95% cf |
| in hot water at 40° C. for 10 days | 100% cf | 100% cf | 100% cf | 100% cf | 100% cf | 100% cf | 100% cf | 100% cf |
| in a 50% windshield washer solution for 10 days | 100% cf | 100% cf | 100% cf | 100% cf | 100% cf | 100% cf | 90% cf | 90% cf |
| Foaming resistance | ○ | ○ | ○ | ○ | ○ | ○ | ○ | |
| Physical properties of cured material | | | | | | | | |
| strength (Tb) (MPa) | 6.5 | 7.0 | 6.4 | 7.1 | 6.6 | 7.1 | 6.8 | 6.1 |
| elongation (Eb) (%) | 220 | 350 | 230 | 350 | 210 | 370 | 320 | 210 |

All ingredients in the table are shown in parts by weight.
Content of adducts 4~7 including solvents are shown in parts by weight.
The content (%) of an adduct in a polyurethane composition = (Content of an adduct in an adduct solution/total weight of a polyurethane composition) × 100
*Comparative Example 1 shows content of Y-9669.

TABLE 2(3)

|  | Example | Comparative Examples | | | Examples | | |
|---|---|---|---|---|---|---|---|
|  | 15 | 3 | 4 | 5 | 16 | 17 | 18 |
| Urethane prepolymers | 100 | 100 | 100 | 100 | 100 | 100 | 100 |
| Carbon black | 102 | 102 | 102 | 102 | 102 | 102 | 102 |
| Dioctyltindilaurate | 0.2 | 0.2 | 0.2 | 0.2 | 0.2 | 0.2 | 0.2 |
| Adduct 4 (adduct content 50.0%) | 0.6 | | | | | | |

TABLE 2(3)-continued

|  | Example | Comparative Examples | | | Examples | | |
| --- | --- | --- | --- | --- | --- | --- | --- |
|  | 15 | 3 | 4 | 5 | 16 | 17 | 18 |
| Adduct 8 (adduct content 100%) |  |  |  |  | 0.79 |  |  |
| Adduct 9 (adduct content 100%) |  |  |  |  |  | 0.79 |  |
| Adduct 10 (adduct content 100%) |  |  |  |  |  |  | 0.79 |
| 3-phenylaminopropyltrimethoxysilane (Y-9669) |  | 0.3 |  |  |  |  |  |
| Biuret adduct (adduct content 70.7%) |  |  | 0.42 |  |  |  |  |
| Isocyanurate adduct (adduct content 80.5%) |  |  |  | 0.37 |  |  |  |
| Content* of an adduct in a polyurethane composition (wt %) | 0.15 | 0.15 | 0.15 | 0.15 | 0.39 | 0.39 | 0.39 |
| Curing time (min.) | 32 | 35 | 33 | 35 | 33 | 33 | 34 |
| Bonding strength to glass plate |  |  |  |  |  |  |  |
| at 20° C. and 65% R.H. for 3 days | 100% cf | 70% cf | 90% cf | 85% cf | 100% cf | 100% cf | 100% cf |
| in hot water at 40° C. for 10 days. | 100% cf | 90% cf | 100% cf | 100% cf | 100% cf | 100% cf | 100% cf |
| in a 50% windshield washer solution for 10 days | 100% cf | 60% cf | 80% cf | 75% cf | 100% cf | 100% cf | 100% cf |
| Bonding strength to painted steel plate |  |  |  |  |  |  |  |
| at 20° C. and 65% R.H. for 3 days | 100% cf | 60% cf | 90% cf | 80% cf | 100% cf | 100% cf | 100% cf |
| in hot water at 40° C. for 10 days | 100% cf | 70% cf | 95% cf | 90% cf | 100% cf | 100% cf | 100% cf |
| in a 50% windshield washer solution for 10 days | 100% cf | 50% cf | 75% cf | 75% cf | 100% cf | 100% cf | 100% cf |
| Foaming resistance | ○ | ○ | ○ | ○ | ○ | ○ | ○ |
| Physical properties of cured material |  |  |  |  |  |  |  |
| strength (Tb) (MPa) | 7.2 | 6.9 | 6.4 | 6.6 | 6.7 | 6.4 | 6.5 |
| elongation (Eb) (%) | 480 | 450 | 440 | 460 | 460 | 430 | 490 |

All ingredients in the table are shown in parts by weight.
Content of adducts components including solvents are shown in parts by weight.
The content (%) of an adduct in a polyurethane composition = (Content of an adduct in an adduct solution/total weight of a polyurethane composition) × 100
*Comparative Example 3 shows content of Y-9669.

When Examples 1~14, and Comparative Example 1 were compared, the Examples 1~14 showed quicker curing time. When Examples 1~14, and Comparative Example 2 were compared, the Examples 1~14 showed no foaming, i.e., good foaming resistance.

Next, Example 15 and Comparative Examples 3~5 were compared. Though each Example, regardless of the kind, contains a relatively small amount of curing agent, the Example 15 showed better bonding strength than the Comparative Examples. Particularly, Example 15 showed far better bonding strength than Comparative Example 4, which contains a biuret adduct, and Comparative Example 5, which contains an isocyanurate adduct. Since Example 15 showed sufficient bonding strength in a small amount, Example 15 will give little influence to physical properties of cured materials.

EXAMPLES 19~24

Examples 19~24 of polyurethane compositions were prepared on the basis of the composition of Example 10. Exceptions were made in each Example in that the amount of adduct 4 were followed by the respective amount in the compositions described in table 3. Moreover, vinyltrimethoxysilane (A-171) or 3-methacryloxypropyltrimethoxysilane (A-174) as an alkenyl group-containing silane compound was also added in each Example in accordance with the respective amount in the compositions described in table 3.

Curing time, bonding strength, and foamability were tested and evaluated on the resultant polyurethane compositions by methods similar to those applied to Example 10. Strength and elongation of these polyurethane compositions were also tested. Results were shown on table 3.

COMPARATIVE EXAMPLES 6~7

Comparative Examples 6~7 of polyurethane compositions were prepared on the basis of the composition of Example 10. Exceptions were made in each Comparative Example in that, instead of adduct 4 and an alkenyl group-containing silane compound, N,N-bis[(3-trimethoxysilyl)propyl]amine (A-1170), or combination of A-1170 and vinyltrimethoxysilane (A-171) was added to each Comparative composition in accordance with the respective amount in the compositions described in table 3.

Curing time, bonding strength, foamability, tensile strength (Tb), and elongation at break (Eb) were tested and evaluated on the resultant polyurethane compositions by methods similar to those applied to Example 10. Results were shown in table 3.

TABLE 3

|  | Examples | | | | | | Comparative Examples | |
| --- | --- | --- | --- | --- | --- | --- | --- | --- |
| Compositions | 19 | 20 | 21 | 22 | 23 | 24 | 6 | 7 |
| Urethane prepolymers | 100 | 100 | 100 | 100 | 100 | 100 | 100 | 100 |
| Carbon black | 102 | 102 | 102 | 102 | 102 | 102 | 102 | 102 |
| Dioctyltindilaurate | 0.2 | 0.2 | 0.2 | 0.2 | 0.2 | 0.2 | 0.2 | 0.2 |

TABLE 3-continued

|  | Examples | | | | | | Comparative Examples | |
| --- | --- | --- | --- | --- | --- | --- | --- | --- |
| Compositions | 19 | 20 | 21 | 22 | 23 | 24 | 6 | 7 |
| Adduct 4 (solid content 50.0%) | 0.4 | 1.5 | 1.5 | 0.4 | 1.5 | 1.5 | — | — |
| A-1170*[1] | — | — | — | — | — | — | 1.5 | — |
| A-171*[2] | 0.5 | 0.5 | 1.5 | — | — | — | — | 1.5 |
| A-174*[3] | — | — | — | 0.5 | 0.5 | 1.5 | — | — |
| Content* of an adduct in Polyurethane Composition(wt %) | 0.10 | 0.37 | 0.37 | 0.10 | 0.37 | 0.37 | 0.74 | 0.73 |
| Curing time (min.) | 32 | 31 | 30 | 31 | 31 | 30 | 65 | 63 |
| Bonding strength to glass plate | | | | | | | | |
| at 20° C. and 65% R.H. for 3 days | 100% cf | 100% cf | 100% cf | 100% cf | 100% cf | 100% cf | 80% cf | 90% cf |
| in hot water at 40° C. for 10 days | 100% cf | 100% cf | 100% cf | 100% cf | 100% cf | 106% cf | 100% cf | 100% cf |
| in a 50% windshield washer solution for 10 days | 100% cf | 100% cf | 100% cf | 100% cf | 100% cf | 100% cf | 70% cf | 70% cf |
| Bonding strength to painted steel plate | | | | | | | | |
| at 20° C. and 65% R.H. for 3 days | 100% cf | 100% cf | 100% cf | 100% cf | 100% cf | 100% cf | 75% cf | 85% cf |
| in hot water at 40° C. for 10 days | 100% cf | 100% cf | 100% cf | 100% cf | 100% cf | 100% cf | 95% cf | 90% cf |
| in a 50% windshield washer solution for 10 days | 100% cf | 100% cf | 100% cf | 100% cf | 100% cf | 100% cf | 70% cf | 70% cf |
| Foaming resistance | ○ | ○ | ○ | ○ | ○ | ○ | ○ | ○ |
| Physical properties of cured material | | | | | | | | |
| Strength: Tb(Mpa) | 5.6 | 5.8 | 6.0 | 5.5 | 5.7 | 5.9 | 5.0 | 5.7 |
| Elongation: Eb(%) | 600 | 550 | 610 | 590 | 540 | 600 | 300 | 540 |

NB: All ingredients in the table are shown in parts by weight
Content of Adduct 4 containing solvent is shown in parts by weight.
Content of Adduct 4 in a polyurethane composition(%) = (Content of an Adduct in an adduct solution/total weight of a polyurethane composition) × 100
*)Comparative Example 6 and 7 show contents of compounds.
*[1]A-1170: N,N-bis[(3-trimethoxysilyl)propyl]amine
*[2]A-171: vinyltrimethoxysilane
*[3]A-174: 3-methacryloxypropyltrimethoxysilaneAdduct 4 (solid content 50.0%)

As is obvious from the test results shown above, one-component moisture curable polyurethane compositions according to the present invention have excellent bonding strength to such as a plate glass, metal, plastics, and painted steel plates without applying a primer thereon. Moreover, the compositions were superior in curing ability, and foaming resistance than typical compositions prepared by using technology in the art. Lysine-based silane compounds (adducts) have an advantage that a solvent removed step is not required since they are prepared without employing any solvent. The polyurethane compositions according to the present invention may be modified to obtain better elongation. Therefore, the compositions according to the present invention are very useful as, for example, sealants for vehicle bodies, coatings and sealants for buildings.

What is claimed is:

1. A one-component moisture curable polyurethane composition comprising:
   (A) a urethane prepolymer having isocyanate terminal groups; and
   (B) at least one silane compound containing an average of at least 1.5 NCO groups, and an average of at least 1.5 hydrolyzable alkoxy groups, the silane compound being selected from the group consisting of (i) a silane compound prepared by an addition reaction of a polyisocyanate compound having at least 3 NCO groups and a secondary aminoalkoxysilane, wherein the polyisocyanate compound is prepared by an addition reaction of a polyol selected from the group consisting of trimethylolpropane, 1,2,5-hexanetriol glycerin, and pentaerythritol, and a diisocyanate and (ii) a silane compound having a lysine structure, and which is prepared by an addition reaction of a lysine isocyanate having 2 or 3 isocyanate groups with a secondary aminoalkoxysilane.

2. The polyurethane composition as set forth in claim 1, wherein the polyol is trimethylolpropane.

3. The polyurethane composition as set forth in claim 1, wherein the content of the at least one silane compound in the polyurethane composition is in the range of from 0.07 to 5 percent by weight, based on the total weight of the polyurethane composition.

4. The polyurethane composition as set forth in claim 1, wherein the content of the at least one silane compound in the polyurethane composition is in the range of from 0.07 to less than 0.5 percent by weight, based on the total weight of the polyurethane composition.

5. The polyuretane composition as set forth in claim 1, wherein the lysine isocyanate is represented by the following formula:

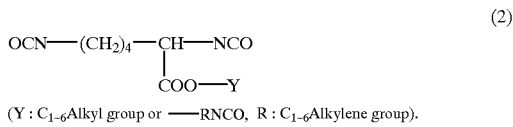

(2)

(Y : $C_{1-6}$Alkyl group or ——RNCO, R : $C_{1-6}$Alkylene group).

6. The polyurethane composition as set forth in claim 1, wherein the polyurethane composition further comprises, in addition to the urethane prepolymer (A) and the silane compound (B), at least one alkenyl group-containing silane compound (C), represented by the following formula:

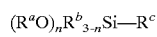

wherein
$R^a O$ represents a hydrolyzable alkoxy group;
$R^b$ represents an alkyl group with a carbon number of 1~3;

$R^e$ represents an alkenyl group-containing organic group; and n is an integer from 1 to 3.

7. The polyurethane composition as set forth in claim 6, wherein the alkenyl group-containing organic group has a heteroatom.

8. The polyurethane composition as set forth in claim 6, wherein the amount of the alkenyl group-containing silane compound (C) in the composition is in the range of from 0.05 to 10 parts by weight, based on 100 parts by weight of the urethane prepolymer.

9. The polyurethane composition as set forth in claim 1, wherein the urethane prepolymer is prepared by reacting a polyol and a polyisocyanate in a reaction mixture having an excess of isocyanate groups relative to hydroxyl groups.

* * * * *